(12) United States Patent
Black et al.

(10) Patent No.: US 9,538,238 B2
(45) Date of Patent: Jan. 3, 2017

(54) COLLECTIVE BROADCASTING BASED ON GEO-LOCALIZED VIDEO STREAMING

(71) Applicant: IWATCHLIFE INC., Ottawa (CA)

(72) Inventors: Charles Black, Gatineau (CA); Jason Phillips, Lower Sackville (CA); Robert Laganiere, Gatineau (CA); Pascal Blais, Ottawa (CA)

(73) Assignee: IWATCHLIFE INC., Ottawa, Ontario (CA)

( * ) Notice: Subject to any disclaimer, the term of this patent is extended or adjusted under 35 U.S.C. 154(b) by 671 days.

(21) Appl. No.: 13/956,753

(22) Filed: Aug. 1, 2013

(65) Prior Publication Data

US 2014/0036090 A1 Feb. 6, 2014

Related U.S. Application Data

(60) Provisional application No. 61/678,954, filed on Aug. 2, 2012.

(51) Int. Cl.
| | |
|---|---|
| *H04N 21/44* | (2011.01) |
| *H04N 7/18* | (2006.01) |
| *H04N 21/45* | (2011.01) |
| *H04N 21/47* | (2011.01) |
| *H04N 21/61* | (2011.01) |
| *H04N 21/4788* | (2011.01) |

(52) U.S. Cl.
CPC .......... *H04N 21/44016* (2013.01); *H04N 7/18* (2013.01); *H04N 21/4524* (2013.01); *H04N 21/4788* (2013.01); *H04N 21/6131* (2013.01); *H04N 21/6181* (2013.01)

(58) Field of Classification Search
CPC ......... H04N 21/27–21/2747; H04N 21/25875; H04N 21/858
See application file for complete search history.

(56) References Cited

U.S. PATENT DOCUMENTS

| | | | | |
|---|---|---|---|---|
| 2002/0152092 | A1* | 10/2002 | Bibas ..................... | G06Q 30/02 705/316 |
| 2005/0060532 | A1* | 3/2005 | Dorenbosch ...... | H04M 1/72563 713/100 |
| 2008/0209480 | A1* | 8/2008 | Eide ..................... | G11B 27/105 725/87 |
| 2008/0271072 | A1 | 10/2008 | Rothschild et al. | |
| 2009/0216636 | A1* | 8/2009 | Eliason .................. | G06Q 30/02 705/14.73 |
| 2010/0273463 | A1* | 10/2010 | Bonnefoy ............. | H04W 4/023 455/414.1 |
| 2012/0011267 | A1 | 1/2012 | Ma et al. | |
| 2012/0179786 | A1* | 7/2012 | Nandagopal .......... | H04L 65/604 709/219 |

* cited by examiner

*Primary Examiner* — Michael Teitelbaum
(74) *Attorney, Agent, or Firm* — Shapiro Cohen LLP

(57) ABSTRACT

A method for providing streamed video data from a plurality of sources within a known geographic area includes receiving at a server, via a communication network, first video stream data captured within the known geographic area using a first user device and second video stream data captured within the known geographic area using a second user device. The first video stream data is provided from the server to a display device associated with a user for being viewed by the user. An indication that the second video stream data is available to be viewed in addition to the first video stream data is also provided, from the server to the display device, via the communication network.

16 Claims, 4 Drawing Sheets

COLLECTIVE BROADCASTING BASED ON GEO-LOCALIZED VIDEO STREAMING

This application claims the benefit of U.S. Provisional Application No. 61/678,954 filed Aug. 2, 2012. The entire contents of U.S. Provisional Application No. 61/678,954 are incorporated herein by reference.

FIELD OF THE INVENTION

The instant invention relates generally to video data streaming, and more particularly to a system and method for delivering multiple streams of video data that are provided from geographically associated user devices.

BACKGROUND OF THE INVENTION

Consumer electronic mobile devices, such as for instance smartphones, feature phones, tablet computers, etc., have enjoyed an explosive growth in popularity in recent years. A large number of the consumer electronic mobile devices that are on the market today include an integrated video camera, as well as wireless transceivers that support voice and data communication over cellular networks and/or Wi-Fi®. Such devices are compact in size and are easily carried around from place to place, making them readily available when an expected or an unexpected event occurs. For instance, a user may be taking part in a peaceful demonstration that unexpectedly deteriorates into a riot, or the user may be attending a spectator event such as a hot air balloon race. In either case, the user may capture video data using the video camera that is embedded in the consumer electronic mobile device and stream the captured video data to one or more other users. For instance, applications such as Skype™ support streaming of private video data from one user to another. Alternatively, as disclosed in United States Patent Application PGPUB No. 2012/0011267 to Ma et al., a live streaming system and method provides cross platform live streaming capabilities to mobile devices. The system that is disclosed by Ma et al. supports live streaming to large mobile audiences, including support for concurrent live events and different encodings of a single live event. Unfortunately, a single live stream for any given event is unlikely to provide full coverage of the event.

In United States Patent Application PGPUB No. 2008/0271072 to Rothschild et al., disclosed is a system and method for providing live, remote location experiences. According to Rothschild et al. a mobile broadcaster provides audio or video information that is geographically referenced, and this audio or video information is provided to an audience based on the geographical reference. Similar to the system and method disclosed by Ma et al., only a single live video stream is available to cover a particular event. That is to say, there is no association between different streams with similar geographical references. Rothschild et al. propose a rather unsatisfactory solution to this problem, which involves setting up a bidding system to allow viewers to obtain the right to direct the mobile broadcaster to go somewhere or to do something. Unfortunately, at best this solution provides improved coverage of an event for only one viewer at a time. Further, the coverage is limited by the mobile broadcaster's ability to move quickly about the event.

It is apparent that the prior art solutions do not support simultaneous coverage of an event at widely separated locations within a given geographic area. For instance, an event such as the peaceful demonstration that unexpectedly deteriorates into a riot may cover an area that is the size of several city blocks, with some or all of the participants being on the move, and with some portions of the riot being separated from other portions of the riot due to blockades, police lines or violence, etc. Under such circumstances the video that is streamed from a single source may be representative of only a very small portion of the area that is affected by the riot. Further, the above-mentioned types of obstacles are likely to impede movement, making it difficult and/or risky to attempt to move about and provide video coverage of other portions of the riot.

It would be advantageous to provide a method and system that overcomes at least some of the above-mentioned limitations of the prior art.

SUMMARY OF EMBODIMENTS OF THE INVENTION

In accordance with an aspect of the invention there is provided method comprising: receiving at a server, via a communication network, first video stream data captured within a known geographic area using a first user device; receiving at the server, via the communication network, second video stream data captured within the known geographic area using a second user device; providing from the server to a display device, via the communication network, the first video stream data for being viewed by a user via the display device; and providing from the server to the display device, via the communication network, an indication that the second video stream data is available to be viewed in addition to the first video stream data.

In accordance with an aspect of the invention there is provided method comprising: providing by a user a request for video stream data captured within a known geographic area; receiving, in response to the request, an indication of a plurality of available video stream data, each of the plurality of available video stream data being captured using a respective user device located within the known geographic area; selecting by the user at least one of the plurality of available video stream data; and receiving by the user the selected at least one of the plurality of available video stream data.

In accordance with an aspect of the invention there is provided method comprising: receiving by a user an invitation to view private video stream data, the private video stream data captured within a known geographic area using a first user device; accepting by the user the invitation to view the private video stream data; in dependence upon accepting the invitation to view the private video stream data, receiving by the user an indication of available public video stream data captured within the known geographic area using a second user device; and selecting by the user the available public video stream data to be viewed in addition to the private video stream.

In accordance with an aspect of the invention there is provided method comprising: receiving at a central server first video stream data from a first user device that is located within a known geographic area, the first video stream data being tagged private such that viewing of the first video stream data by a user requires successful authentication of the user; receiving at the central server at least second video stream data from at least a second user device located within the geographic area, the at least second video stream data being tagged public such that viewing of the at least second video stream data by the user other than requires successful authentication of the user; receiving via a display device a request from the user to view the first video stream; and when the user is successfully authenticated to view the first video stream data, providing to the display device the first video stream data and providing an indication that the second video stream data is available to be viewed in addition to the first video stream data.

In accordance with an aspect of the invention there is provided method comprising: receiving at a server, via a communication network, video stream data provided from each of a plurality of user devices; defining a first event comprising video stream data that are provided from a first subset of the plurality of user devices, each user device of the first subset being located within a same first predetermined geographic area during providing of the respective video stream data; defining a second event comprising video stream data that are provided from a second subset of the plurality of user devices, each user device of the second subset being located within a same second predetermined geographic area during providing of the respective video stream data; receiving a request from a user for video stream data captured within one of the first predetermined geographic area and the second predetermined geographic area; and in response to the request, performing one of: providing to the user at least a portion of the video stream data of the first event when the request relates to the first predetermined geographic area, and providing to the user at least a portion of the video stream data of the second event when the request relates to the second predetermined geographic area.

BRIEF DESCRIPTION OF THE DRAWINGS

Exemplary embodiments of the invention will now be described in conjunction with the following drawings, wherein similar reference numerals denote similar elements throughout the several views, in which.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1A:
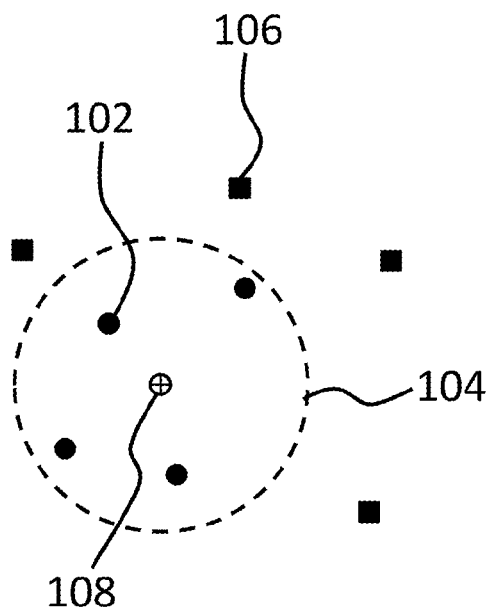
FIG. 1A is a simplified diagram showing a plurality of video stream sources, some of which are located within a predetermined geographic area that is centered on a current location of a source of a private video stream, according to an embodiment of the instant invention.

FIG. 1A is a simplified diagram showing a plurality of video stream sources, each video stream source being depicted using either a circular dot or a square dot. In particular, the video stream sources that are depicted using circular dots in FIG. 1A (e.g., circular dot 102) have a current location that is within a predetermined geographic area 104, and the video stream sources that are depicted using square dots (e.g., square dot 106) have a current location that is outside of the predetermined geographic area 104. Further, the open circular dot 108 represents a source of a private video stream, whilst the closed circular and square dots e.g., 102, 106, etc., each represent a source of a public video stream. A private video stream is a video stream that is intended for viewing by authorized viewers only. On the other hand, any user may view a public video stream. As such, viewers may be required to "log in" or complete an authorization process prior to receiving access to a private video stream. Alternatively, a user may receive an invitation to view a private video stream. Of course, FIG. 1A shows only the location of each video stream source relative to the locations of the other video stream sources; FIG. 1A does not depict any geographic features or other points of reference. Optionally, more than one source of a private video stream is provided. Further optionally, the representations of the different video streams includes an indication of the direction of video capture, such as for instance an arrow or an expanding cone that extend from each dot in a respective direction of video capture. Such direction information is available, for instance, through the compass and INS device in smartphones.

The geographic area 104 in this specific and non-limiting example is a circular area, having a center point that is denoted using a cross-marker (+). In FIG. 1A the cross-marker is aligned with the open circular dot 108, indicating that the geographic area 104 is centered on a current location of the source of the private video stream. Optionally, the geographic area "follows" the source of the private video stream as that source moves about. Optionally, the geographic area is a different geometric shape, such as for instance a square area or a triangular area. Optionally, the geographic area is an irregular shape, for instance a shape that is defined by geographic features or boundaries, including specific roadways, waterways, etc. The size of the geographic area may depend on the nature of an event that is occurring within the geographic area, or it may be defined in absolute terms based on either default or user defined parameters. For instance, in the example of a hot air balloon race the geographic area may be an elongated area that extends along at least a portion of the race route. On the other hand, in the example of a riot or a demonstration the geographic area may be a circular area with a radius of 200 meters, relative to a specific video stream source, etc.

Figure 1B:
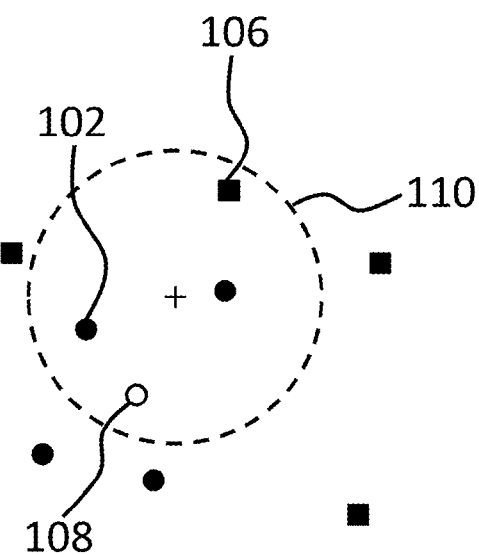
FIG. 1B is a simplified diagram showing a plurality of video stream sources, some of which are located within a predetermined geographic area that is centered on a fixed point, according to an embodiment of the instant invention.

FIG. 1B depicts a variation of the system that is shown in FIG. 1A. In particular, the geographic area 110 in FIG. 1B is a circular area that is centered on a fixed point, as indicated by the cross-marker (+). The same group of video stream sources that is shown in FIG. 1A is also shown in FIG. 1B, but since the center of the geographic area 110 is different than the center of the geographic area 104, some of the square dots are now shown inside the geographic area 110 and some of the circular dots are now shown outside of the geographic area 110. In the example that is shown in FIG. 1B, the geographic area 110 does not change during an event. Optionally, the geographic area 110 is redefined one or more times during an event. For instance the fixed center point (+) is adjusted to follow the movement of a mob during a riot or to follow the progress of the hot air balloons during a hot air balloon race, etc. Optionally, the geographic area is a different geometric shape, such as for instance a square area or a triangular area. Optionally, the geographic area is an irregular shape, for instance a shape that is defined by geographic features or boundaries, including specific roadways, waterways, etc. The size of the geographic area may depend on the nature of an event that is occurring within the geographic area, or it may be defined in absolute terms based on either default or user defined parameters. For instance, in the example of a hot air balloon race the geographic area may be an elongated area that extends along at least a portion of the race route. On the other hand, in the example of a riot or a demonstration the geographic area may be a circular area with a radius of 200 meters, relative to a specific fixed point, etc.

The variation that is depicted in FIG. 1B supports a selection, by a user, of a specific point or location from which the user wishes to receive streamed video data. For instance, the user may specify latitude and longitude coordinates or other similar values, or the user may specify a specific intersection, a specific address or a recognizable landmark, etc. When it is determined that a source of video stream data is present within a geographic area that encompasses the user defined point or location, then the user is notified and/or given the option to view the video stream data from that source.

The video stream sources that are depicted in both FIG. 1A and FIG. 1B are consumer electronic mobile devices, such as for instance smartphones with integrated video cameras or another similar device. Each video stream source also includes a location-determining element, such as for instance an assisted global positioning system (GPS) element. The location-determining element determines a current location of the video stream source, and information relating to the determined current location is provided in association with a stream of video data. The current locations of the video stream sources are updated at least periodically, and during each update some of the video stream sources may move outside of the geographic area 104 or 110 and become unavailable to the user, or new video stream sources may enter the geographic area 104 or 110 and become available to the user.

In the systems that are shown in FIG. 1A and FIG. 1B, the geographic area 104 and 110, respectively, is defined such that video stream data from any of the video stream sources within the geographic area relate to a same event. An example is provided, with specific reference to FIG. 1A, in which a first user is attending a demonstration that deteriorates into a riot. The first user uses his or her smartphone or other similar device to capture video data and provides the captured video data as a stream of private video data. In this example, the first user's smartphone is the source of the private video stream 108. The first user sends an invitation, inviting a second user to view the stream of private video data. The second user accepts the invitation and views the stream of private video data that is provided from the source of the private video stream 108. At some point, the second user wishes to receive a more complete coverage of the events that are unfolding during the riot. The second user therefore selects one or more of the sources of public video streams, which are indicated using the circular dots within the geographic area 104 of FIG. 1A. Optionally, selecting one of the public video streams causes a display device associated with the second user to stop viewing the private video stream and to start viewing the public video stream. Alternatively, the display device associated with the second user supports a picture-in-picture or split screen viewing mode, such that the second user may view the private video stream and one or more public video streams simultaneously. In this example, the second user is able to receive coverage from the source of the private video stream 108 and up to four different sources of public video streams. Optionally, during viewing the switching from video stream to video stream is performed in an automated or pseudo-random manner, and is optionally based on predetermined criteria such as for instance displaying streams with motion exceeding a threshold level, displaying streams that contain people, or displaying streams having the highest video quality (lighting, contrast, etc.).

By viewing multiple video streams relating to the same event, the second user is able to view the activity that is occurring at different locations within the geographic area 104, or the second user is able to follow the progress of specific activity within the geographic area 104. For instance, initially the source of the private video stream provides coverage of a mob of rioters setting vehicles ablaze. As the mob makes its way toward the source of public video stream 102 and begins to loot storefronts, the second user selects the source of public video stream 102 and continues to receive coverage of the activities of the same mob of people. Alternatively, selecting other sources of public video streams results in the second user receiving coverage of the activities that are occurring at other locations within the geographic area 104. Of course, the system that is shown in FIG. 1B also provides similar functionality. However, in the system that is shown in FIG. 1B the geographic area 110 does not "follow" the source of the private video stream 108 but rather it is fixed in place.

Optionally, advertisements are displayed in association with public streams during viewing. Revenue that is generated by displaying such ads may be shared between the service provider and the sources of the public streams, as a way of incentivizing individuals to record events that are of interest and to make the streams available for public viewing. Of course, when displaying of the public streams is tied to the quality of the streams, then the individuals will be further incentivized to provide streams with activity and generally higher quality content.

Further optionally, the private and/or video streams are stored at least temporarily on a storage medium, such as for instance a centralized server facility. In this way, individuals may for instance view a current video stream relating to the aftermath of an event such as a riot and select archived video streams showing the action that occurred previously, etc.

Figure 2:
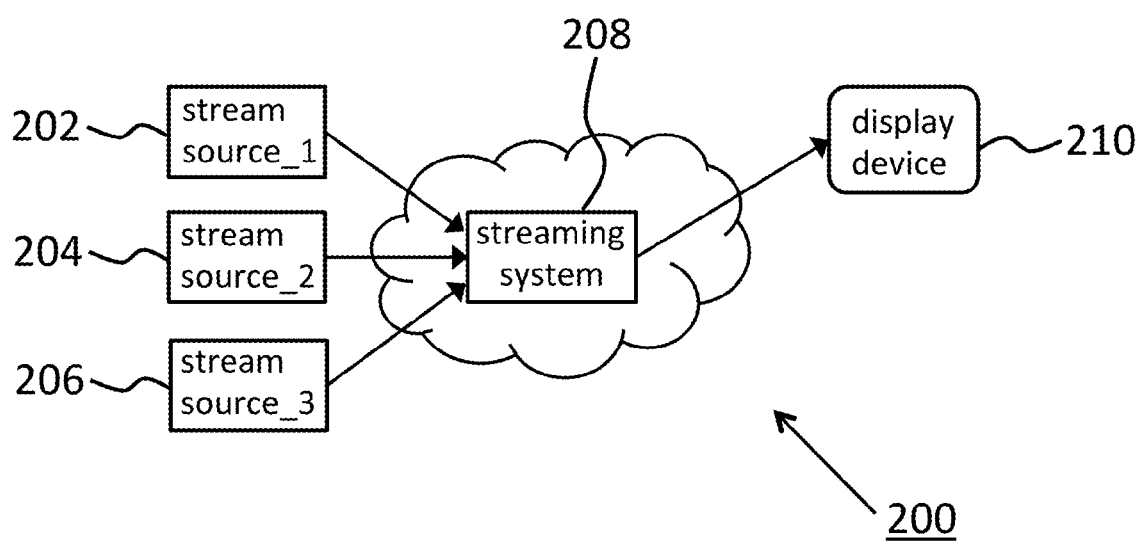
FIG. 2 is a high-level block diagram of a system for delivering multiple streams of video data that are provided from geographically associated user devices.

Referring now to FIG. 2, shown is a high-level block diagram of a system 200 for delivering multiple streams of video data to a user display device, the multiple streams of video data being provided from geographically associated video stream sources. In particular, video stream sources 202, 204 and 206 each provide a stream of video data to a streaming system 208. Associated with each stream of video data are location data, the location data being indicative of a current location of the respective stream source. Optionally, direction data is also associated with each stream of video data, thereby defining a field-of-view for the stream. Based on the location data, the stream system 208 geographically associates at least some of the streams of video data. For instance, based on the location data the stream system 208 associates the stream of video data from stream source_1 and the stream of video data from stream source_2 with a first geographic area and the system 208 associates the video data from stream source_3 with a second geographic area. In response to a request from a user associated with display device 210 for streamed video data from within the first geographic area, the stream system 208 provides to the user the option of selecting the stream of video data from either stream source_1 or stream source_2. In response to receiving a selection from the user, the stream system 208 streams video data from the selected one of stream source_1 and stream source_2. Optionally, the user selects both stream source_1 and stream source_2, in which case the streams of video data are viewed in split screen mode or in a picture-in-picture mode of display device 210. When archived streamed video data from within the first geographic area is available, optionally the user selects an archived stream and views previously captured video data from within the first geographic area. By way of several specific and non-limiting examples, the display device 210 is one of a smartphone, a tablet computer, a laptop computer, a desktop computer, a Personal Digital Assistant (PDA), a television, etc.

The stream system 208 may define the first and second geographic areas in the manner as discussed supra with reference to either of FIGS. 1A and 1B. In particular, the first and second geographic areas may each be centered on a specific, fixed point. Alternatively, the first geographic area is centered on one of stream source_1 and stream source_2, and the second geographic area is centered on stream source_3, etc. Each one of the video stream sources 202, 204 and 206 may be private or public. Optionally, advertisements or other revenue generating content is displayed in association with the display of public video streams.

In a specific implementation, the stream sources 202, 204 and 206 are smartphones or other similar consumer electronic mobile devices. Each smartphone or similar device has an integrated video camera, a location determining element and a communication element. Optionally, each smartphone or similar device includes a direction-determining device, such as for instance a compass and INS device. Optionally, each smartphone or similar device includes a memory element for storing a local copy of the captured video data at the video source end. An individual associated with each of the smartphone or similar device captures video data using the integrated video camera thereof. The location-determining element, such as for instance GPS, determines a current location of the smartphone or similar device either during capturing of the video data or at intervals of time. The captured video data is streamed from the smartphone or similar device to a server of the streaming system 208. Optionally, the captured video data is stored at the server, or at another cloud-based storage location. The location information, as determined using the location-determining element, and optionally direction information is provided along with the streamed video data. For instance, the video data and the location and optional direction information are provided from the communication element of the smartphone or other similar device to the streaming system 208, via a communication network. The streaming system 208 uses the location/direction information to fill user requests for video data originating at a certain location, such as for instance user requests that are provided via display device 210. That is to say, the streaming system 208 provides video data streams for being displayed via display device based on the user request for video data from a certain location and the location information that is associated with each of the video streams.

Figure 3:
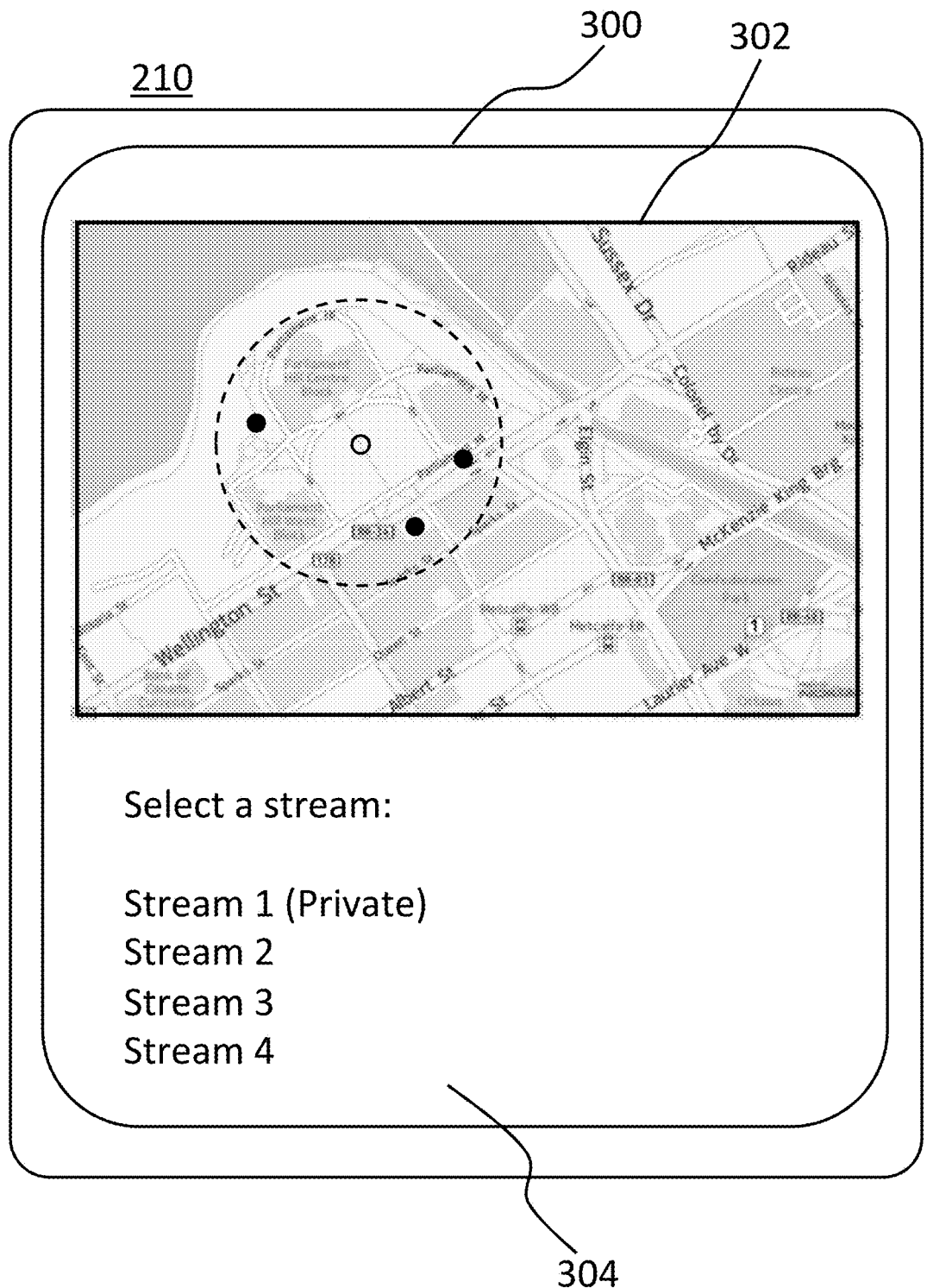
FIG. 3 is a simplified illustration showing a display device indicating a current location of each one of a plurality of video stream sources, according to an embodiment of the instant invention.

Referring now to FIG. 3, shown is a simplified diagram of a display device. The display device 210 includes a display portion 300. In this specific and non-limiting example the display portion is a touch sensitive display screen or touch screen. The touch screen is divided into two regions, a map region 302 and a stream-selecting region 304. The map region 302 displays a visual representation of a geographic area and surrounding area. In the example that is shown in FIG. 3 the map region 302 displays map data for the Parliament Hill section of downtown Ottawa, Canada, which is a popular location for demonstrations and protests. The map region 302 displays a geographic area, as indicated using the dashed-line circle, which in this particular example has an open dot at its center representing a source of a private video stream data. In one implementation, a user associated with the source of the private video stream data sends an invitation to the user associated with the display device 210, thereby causing the geographic area to be defined relative to the source of the private video stream data. Alternatively, the user associated with the display device 210 views the displayed map and notes the presence of the source of the private video stream data, and by selecting the source of the private video stream data causes the geographic area to be defined relative to the source of the private video stream data. Further alternatively, the user selects any point within the map region 302, thereby causing the geographic area to be defined relative to the selected point.

The display device 210 includes a communication element that supports communication between the display device 210 and the stream server 208 via a communication network. During use, a data signal indicative of the user's selection of the geographic area within the map region 302 is transmitted from the display device 210 to the stream server via the communication element. The stream server 208 receives the data signal and determines sources of video stream data having a current location that is within the selected geographic area. In the instant example, the stream server 208 determines that stream 1 (Private), stream 2, stream 3 and stream 4 are all within the selected geographic area. The stream server 208 transmits to the display device 210 a signal indicative of the available streams, and identifiers for the available streams are displayed to the user within the selecting region 304 of the display portion 300 of display device 210. Optionally, identifiers include direction information to aid the user in selecting one of the available streams.

Figure 4:
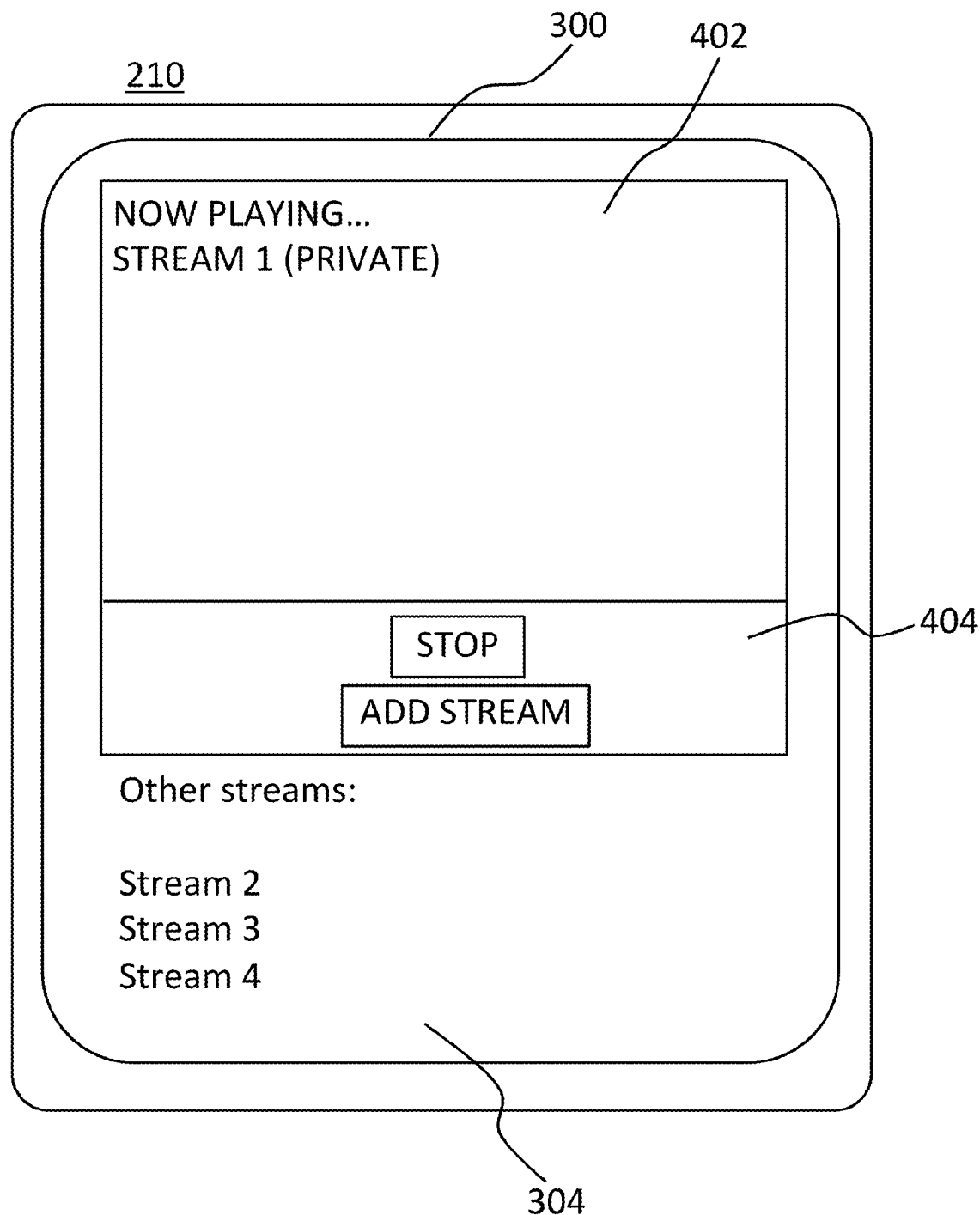
FIG. 4 is a simplified illustration showing the display device of FIG. 3 during displaying of a video stream identified as STREAM 1, according to an embodiment of the instant invention.

Referring now to FIG. 4, shown is a simplified diagram of the display device 210 after the user has selected the display of a video stream identified as stream 1. The map region 302 is replaced by a display window 402, within which the video stream data of the selected stream 1 is displayed. In the example that is shown in FIG. 4, the selected stream 1 is a private video stream. As such, the user may be required to sign into view the video stream data, or otherwise authenticate himself or herself to the stream server 208. A control window 404 is provided to support adding video streams to the display, stopping current viewing of a video stream, etc.

Figure 5:
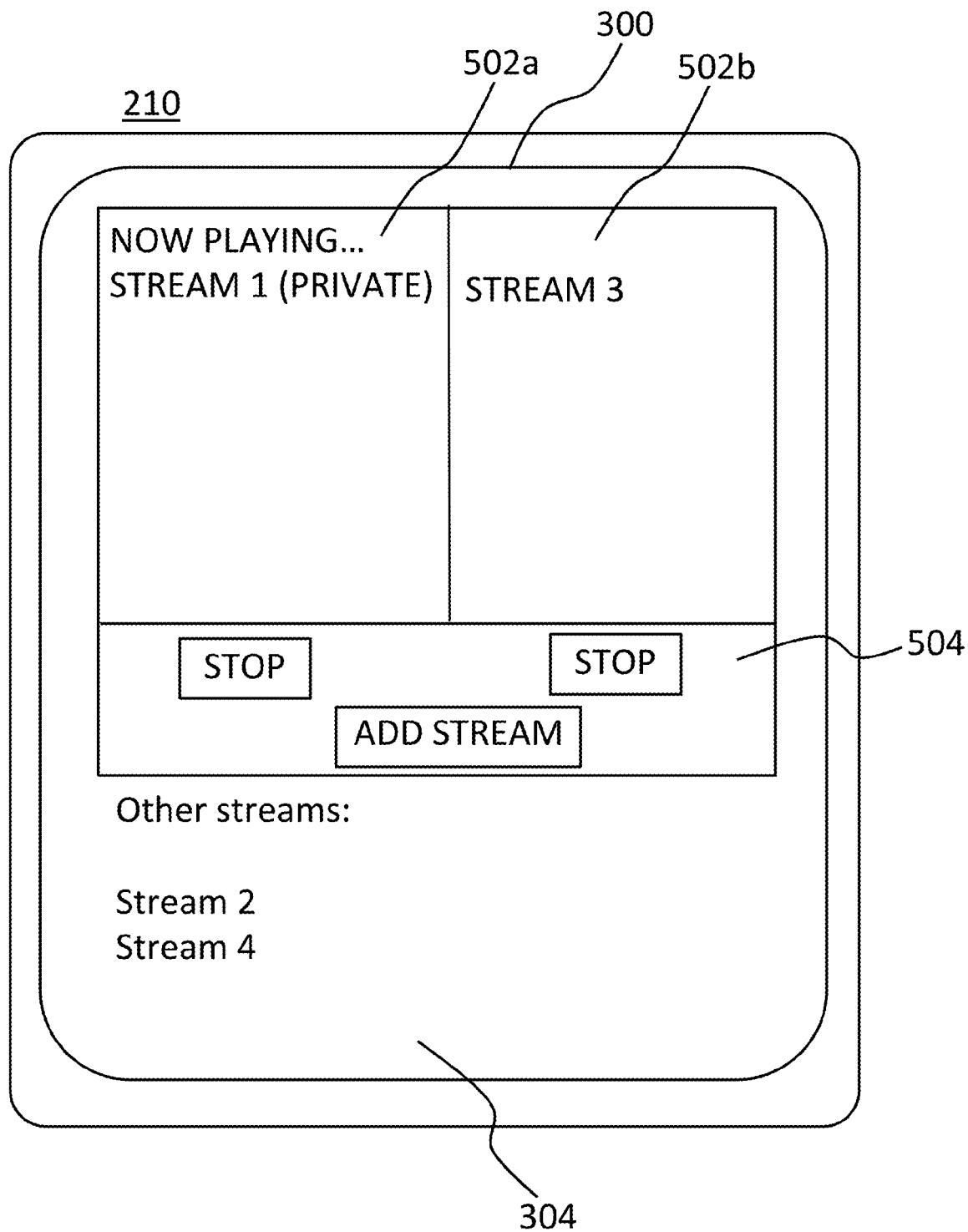
FIG. 5 is a simplified illustration showing the display device of FIG. 3 during displaying of the video stream identified as STREAM 1 in a first portion of the display and displaying of the video stream identified as STREAM 3 in a second portion of the display, according to an embodiment of the instant invention.

Referring now to FIG. 5, shown is a simplified diagram of the display device 210 after the user has selected the simultaneous display of a video stream identified as stream 1 and of a video stream identified as stream 3, in a split display window 502*a*/502*b*. For instance, during viewing of stream 1 as described supra with reference to FIG. 4 the user notices interesting activity that is occurring away from the source of video stream 1, but still within the user-selected geographic area. The user selects stream 3 from the selecting region 304, since the current location of the source of video stream 3 is close to the location of the interesting activity. The display window 402 is reformatted to define a split window 502a/502b, and video stream data for video stream 3 are displayed side-by-side with the video stream data for video stream 1. Additionally, the modified control window 504 replaces control window 404, to provide controls for the display of each one of stream 1 and stream 3. Of course, optionally the user may select further additional streams to be displayed simultaneously with stream 1 and stream 3. Optionally, the user may view one selected stream in a large window and another selected stream in a smaller window, such as for instance in a picture-in-picture mode of display. Referring still to FIG. 5, the user may stop the displaying of one of the video streams, and resume or begin watching the other video stream in a full-window display mode.

Optionally, the display device 210 includes a memory element to support local storage and/or buffering of the user selected video streams. Optionally, additional control buttons are provided within control window 404/504 to support pausing and/or fast forwarding and/or rewinding etc. of buffered video stream data. Optionally, other video controls such as zooming, panning, etc. are supported.

In an optional embodiment, in which the display device 210 is a mobile device such as for instance a smartphone, a current location of the display device defines the center of geographic area 104. In this optional embodiment, the user is presented with a selection of available video streams captured by video sources that are located in close proximity to the user. For instance, during a trip to Disneyland the user is able to select video streams captured by other individuals that are also at Disneyland.

In some embodiments, the available video data streams are indicated based on dynamic determination of video streams of interest. Dynamic determination of groups of video sources in the form of video cameras allows for relative motion between cameras to be accounted for dynamically during use. Further, grouping of video data streams is supported based on analyzing content of video data streams, for example to determine overlapping views. Alternatively, analysis is for similar views of different locations, for example waterfalls, or different views from a same location, for example views from the Empire State Building, or similar views of the same area, for example views of Central Park. Alternatively, instead of video analytics, users provide feedback to indicate video data streams that are relevant to them in order to result in a final grouping. New video sources entering a geographic area or that are otherwise identified are indicated to the users to determine an interest level in a content thereof.

For example, a first user watching a soccer game is presented with an indication of other cameras providing a video data stream of the field. Selection of different cameras provides for changing views. When a parent moves onto the field or engages their video camera, the first user receives an indication that the camera is now available. As such, the indication is dynamic in nature supporting additional camera, the removal of cameras, and optionally filtering of cameras.

In some embodiments, the determination is, for the most part, performed in advance to provide binning of video data sources based on one or more criteria. Mobile video data sources are then analysed dynamically as needed to add or remove them from groupings that are active.

Of course other factors in grouping of video data sources are also envisioned such as grouping video data sources based on events, for example a bird coming into view; based on similar object, for example viewing cathedrals; based on similar field of view, for example a same soccer field; based on similar geography, for example centered on a GPS coordinate; and based on a grouped content, for example comprising similarly tagged items or people or a group of known people or items.

Numerous other embodiments may be envisaged without departing from the scope of the invention.

What is claimed is:

1. A method comprising:
   receiving at a server, via a communication network, video stream data captured within a known geographic area using a plurality of user devices;
   selecting by a user first video stream data of the video stream data, the first video stream data captured using a first user device of the plurality of user devices;
   determining by the server second video stream data of the video stream data, the second video stream data captured using a second user device of the plurality of user devices and the second user device having at least one of a geographic relevance and an event relevance to the first user device;
   providing from the server to a display device, via the communication network, the first video stream data for being viewed by the user via the display device; and
   providing from the server to the display device, via the communication network, an indication that the second video stream data is available to be viewed in addition to the first video stream data;
   wherein the known geographic area is centered on a current location of the first user device and wherein the second user device moves relative to the first user device and wherein the indication that the second video stream data is available to be viewed in addition to the first video stream data is other than provided when a distance between the first user device and the second user device exceeds a predetermined threshold value.

2. A method comprising:
   receiving at a server, via a communication network, video stream data captured within a known geographic area using a plurality of user devices;
   selecting by a user first video stream data of the video stream data, the first video stream data captured using a first user device of the plurality of user devices;
   determining by the server second video stream data of the video stream data, the second video stream data captured using a second user device of the plurality of user devices and the second user device having at least one of a geographic relevance and an event relevance to the first user device;
   providing from the server to a display device, via the communication network, the first video stream data for being viewed by the user via the display device; and
   providing from the server to the display device, via the communication network, an indication that the second video stream data is available to be viewed in addition to the first video stream data;
   wherein the known geographic area is centered on a fixed point, at least one of the first user device and the second user device moves relative to the fixed point, and wherein the indication that the second video stream data is available to be viewed in addition to the first video stream data is other than provided when a distance between the first user device and the second user device exceeds a predetermined threshold value.

3. The method of claim 1 wherein the known geographic area is associated with an event that is of interest to the user.

4. The method of claim 1 wherein the first user device and the second user device are smartphones.

5. The method of claim 1 wherein the first video stream data is private and wherein providing the first video stream data from the server to the display device comprises authenticating the user.

6. The method of claim 5 wherein the second video stream data is public and is available to be viewed absent authenticating the user.

7. The method of claim 6 comprising displaying advertising content in association with displaying of the second video stream data.

8. The method of claim 1 wherein the user devices of the plurality of user devices are provided by a plurality of different owners, and wherein each user device provides to the server location data indicative of a location of said user device during capturing of the video stream data.

9. The method of claim 8 wherein the known geographic area is defined by the user and wherein determining is performed based on the location data.

10. The method of claim 1 wherein the known geographic area is associated with an event that is of interest to the user.

11. The method of claim 1 wherein the first user device and the second user device are smartphones.

12. The method of claim 1 wherein the first video stream data is private and wherein providing the first video stream data from the server to the display device comprises authenticating the user.

13. The method of claim 12 wherein the second video stream data is public and is available to be viewed absent authenticating the user.

14. The method of claim 13 comprising displaying advertising content in association with displaying of the second video stream data.

15. The method of claim 1 wherein the user devices of the plurality of user devices are provided by a plurality of different owners, and wherein each user device provides to the server location data indicative of a location of said user device during capturing of the video stream data.

16. The method of claim 15 wherein the known geographic area is defined by the user and wherein determining is performed based on the location data.

* * * * *